Oct. 21, 1941.  S. H. ERSHLER  2,259,519
HOT FOOD STORAGE TABLE
Filed May 26, 1939  2 Sheets-Sheet 1
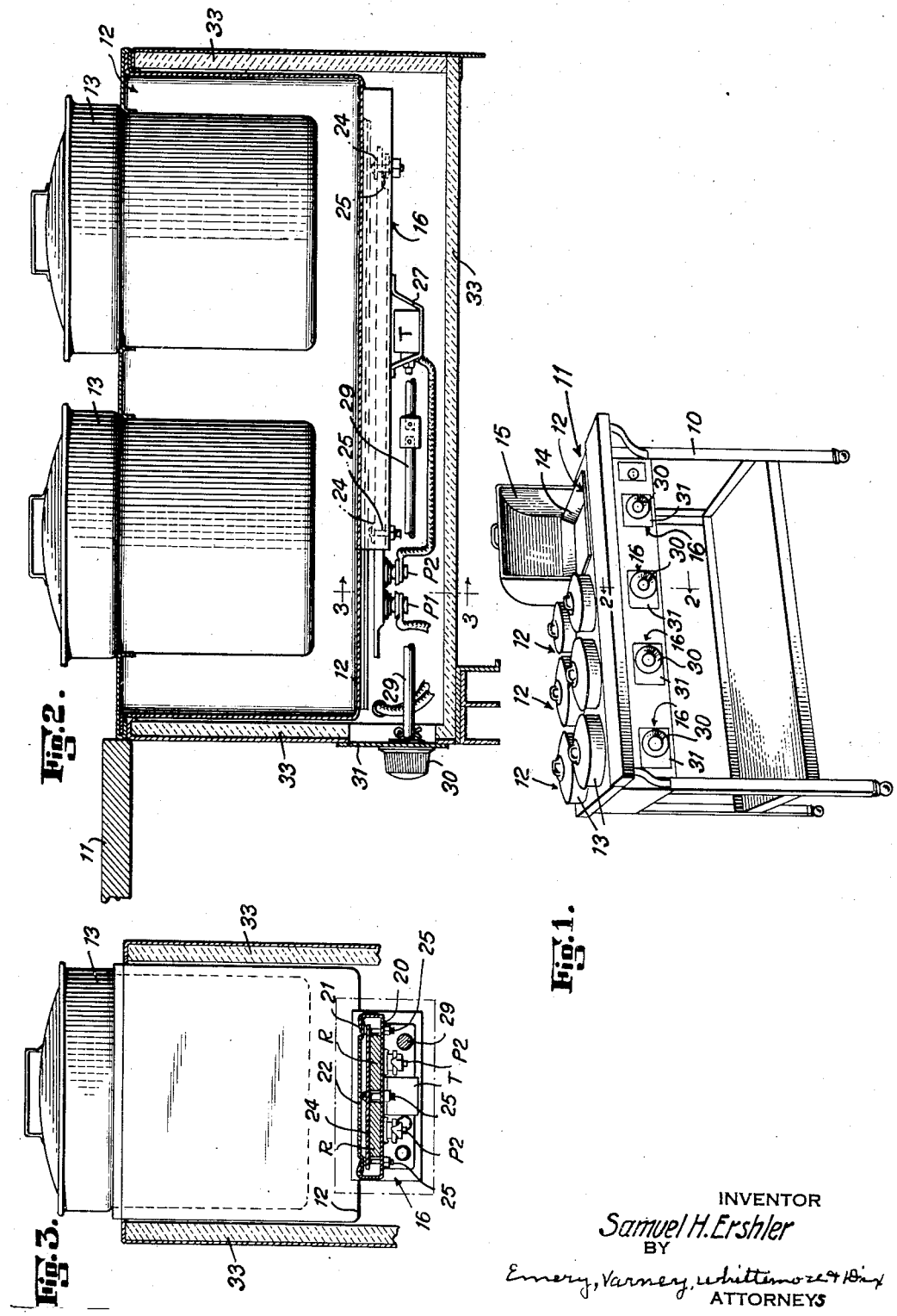
INVENTOR
Samuel H. Ershler
BY
Emery, Varney, Whittemore & Dix
ATTORNEYS Oct. 21, 1941     S. H. ERSHLER     2,259,519
HOT FOOD STORAGE TABLE
Filed May 26, 1939     2 Sheets—Sheet 2

INVENTOR
Samuel H. Ershler
BY
Emery, Varney, Whittemore & Dix
ATTORNEYS

Patented Oct. 21, 1941

2,259,519

UNITED STATES PATENT OFFICE 2,259,519

HOT FOOD STORAGE TABLE

Samuel H. Ershler, Woodcliff, N. J.

Application May 26, 1939, Serial No. 275,817

3 Claims. (Cl. 219—19)

This invention relates to hot food storage tables, particularly to electrical heating means therefor, and has for an object the provision of improvements in this art.

The steam tables which are now commonly used in restaurants and other places for keeping food warm and ready to serve include a single water tank for all of the food insets or containers which are used. This is inherently inefficient because it is not usually necessary or desirable to heat all the food insets at the same time or to heat them to the same temperature. Moreover, there are certain obvious limitations and disadvantages in using water as a reservoir of heat.

In some of the electrically heated food storage tables a heat adjusting device is provided but this is placed in the bottom of the food inset compartment, rendering it necessary to remove some or all of the food insets from the compartment before the adjustment can be made. This is so troublesome and likely to produce food spillage and burns to the attendants that in practice the desired adjustments are seldom made. Consequently the continuous optimum temperatures for each food inset are not realized and the cost of operation is unnecessarily high.

According to the present invention each food inset or each small group of insets is placed in a separate compartment and each compartment is heated by a separate and independent electrical heating unit. Furthermore, each heating unit is provided with heat adjusting means and manual controls therefor which are readily accessible to the operator from the front of the table; and each heating unit together with its controls is readily removable for the purpose of inspection, repair or replacement. The heating units are made with a plurality of heating elements and suitable connections so as to be readily adapted to use either 110 or 220 volt current without requiring separate thermostats.

An exemplary embodiment of the invention is illustrated in the accompanying drawings, wherein:

Fig. 1 is a front perspective elevation of a hot food storage table embodying the present invention;

Fig. 2 is a vertical section taken approximately on the line 2—2 of Fig. 1;

Fig. 3 is a vertical section taken on the line 3—3 of Fig. 2;

Figure 6:
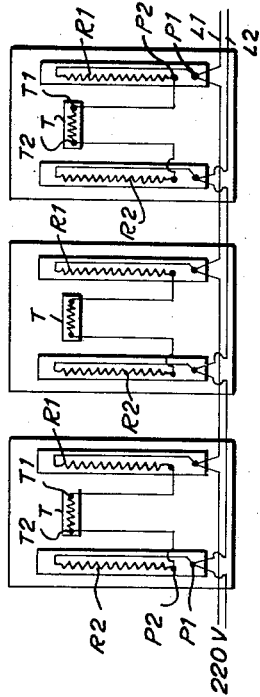
Fig. 6 is a wiring diagram with the heating elements of a unit connected in series for 220 volt current.

The device shown in Fig. 1 comprises a stand 10 and a table 11, the latter including four separate heating compartments 12. Three of the compartments take two insets 13, each arranged one behind the other, and the fourth compartment takes a single inset in the form of a pan 14 for which a telescopic cover 15 is provided.

For each compartment a separate removable electrical heating unit 16 is provided, each heating unit including a thermostat control T whereby heat may be applied in regulated amount to each compartment or entirely cut off, as desired. It is to be noted that the thermostatic controls are accessible to the attendant at the front of the table and do no require the removal of food insets and water for access, as has been usual heretofore.

One of the removable heating units 16 is shown in Figs. 2 to 5. It comprises a metal cassing 20 having overhanging flanges 21 which slide along the free edges of a supporting plate 22 which is secured to the bottom wall of a compartment 12. Preferably the attachment is made by spot welding the plate between the heating openings 19, as at 23, to the bottom wall of the compartment.

A plurality of heating elements R are secured to the casing 20 by clamping plates 24 and bolts 25. Two heating elements for each unit are shown herein. Each heating element is provided with terminal posts P1, P2 for electrical connections. Beneath the casing 20 and secured thereto by straps 27, there is placed the thermostat T. An adjusting rod 29 for the thermostat (Fig. 2) extends to the front of the table where a removable dial knob 30 is secured thereon. A cover plate 31 provided with a dial scale 32 is secured to the table front over the opening through which the heating unit 16 is inserted and removed. While a manual control for each heating unit is shown, it may in some cases be desirable to control a plurality of heating units from a single point. The accessibility to the heating units and their leads makes easy the changes necessary to provide various types of controls to suit any requirement.

Figure 7:
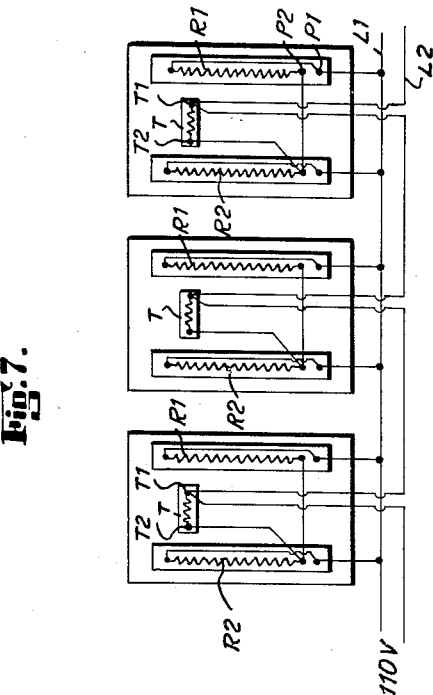
Fig. 7 is a wiring diagram with the heating elements of a unit connected in parallel for 110 volt current.
Figure 4:
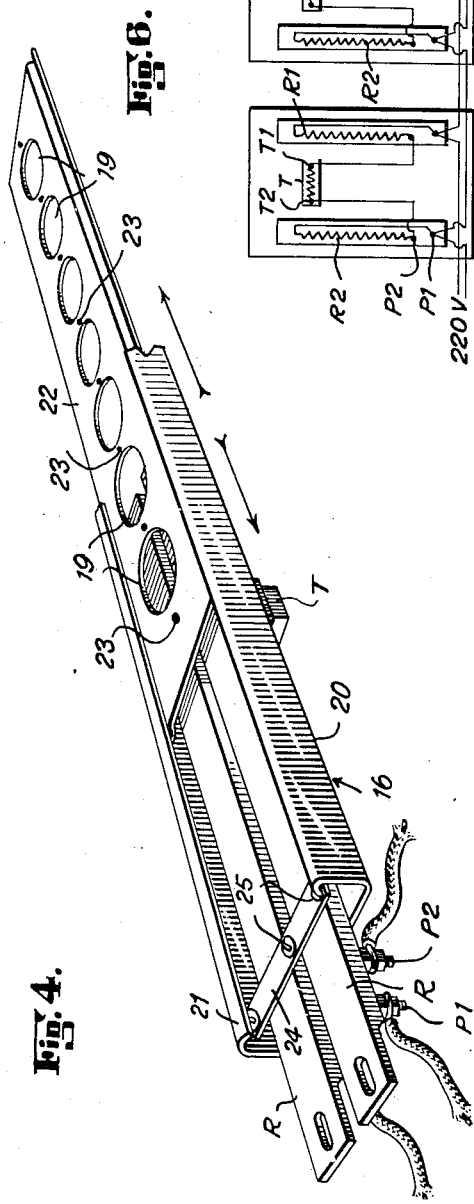
Fig. 4 is a perspective view of a heating unit and its mounting means.
Figure 5:
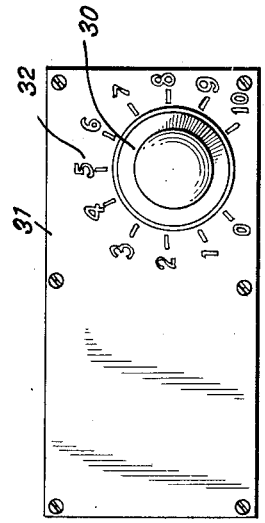
Fig. 5 is a front elevation of a single heating unit.

From the wiring diagrams shown in Figs. 6 and 7 it will be seen that when the device is served by 220 volt current, Fig. 6, the thermostat is arranged in series between the divided resistance elements; and when it is served by 110 volt current, Fig. 7, the thermostat is placed in series with the divided resistances together. The power leads are designated L1, L2, the separate resistance elements are designated R1, R2, the posts of each resistance as P1, P2, and the terminal posts as T1, T2.

Each compartment together with its heating unit is separately enclosed except at the top by insulation 33. The line leads L1, L2 pass through the insulation between the compartments and behind the front wall of the table, enough slack being left in the leads between the heating units to permit them to be withdrawn sufficiently to make the connections at the posts P1, P2 from the outside. If desired, contacts may be provided which are automatically engaged when the heating units are pushed into their operating positions.

In removing the heating unit it is only necessary to take out the screws from the front plate 31 and pull out the assembly along the slide edges of the fixed support member 22 until the binding posts P1 of the heating elements are clear of the front wall of the table, whereupon the leads may be disconnected and the unit completely removed. This procedure may be effected very easily and quickly. However, there are enough parts to disconnect to deter the usual attendant from trying to make repairs and to require the services of an approved repairman. With this construction it is an easy matter to remove a unit and repair it or return it to the factory for repair while another has been inserted in its place; whereas with previous constructions it has been necessary to return the whole piece of equipment to the factory in order to have the heating element repaired.

With this construction it is possible to obtain frequent adjustment of the amount of heat supplied because the heat control elements are located conveniently at the front of the table. As stated above, where the heat adjustment means are located in the bottom of the compartment so as to necessitate removal of insets in order to make the adjustment, the result was that adjustments would seldom be made, and improper temperatures and waste of heat prevailed.

By having the heating unit placed in the same insulated enclosure in which the inset compartment is placed and by having it mounted directly upon the bottom of the compartment, the heat is conserved and applied very directly to the intended purpose. The large openings in the mounting plate 22 permit heat to pass directly from the heating units to the bottom of the inset compartment by radiation. There is also an intimate transfer by conduction through the metal parts.

It is thus seen that a very efficient and convenient construction is provided which permits each inset compartment to be heated or cut off at will and which also permits each compartment to be heated to any degree desired. The construction is very simple and convenient and may be readily adapted for use with the prevailing current supplies, either 220 volt or 110 volt, at the time the apparatus is set up and placed in use. This avoids the necessity of having to procure from the factory different heating units for different voltages.

While one embodiment of the invention has been described in detail for purposes of illustration, it will be understood that the invention may be variously embodied within the limits of the prior art and the scope of the subjoined claims.

I claim:

1. A hot food storage table, comprising in combination, a food inset compartment, an insulating enclosure for said compartment and a heating unit therefor, a metal plate secured intermediate its width to the bottom wall of said compartment and having its side edges standing clear of the bottom wall to form supporting slides, said plate having large openings for the passage of heat directly from a heating element to said compartment wall, a removable heating unit including a casing having a bottom and side walls with over-hanging edges adapted to ride on the slide edges of said plate, a heating element in said casing, a thermostat mounted on and beneath the bottom of said casing, terminal posts located near the front of said casing for selectively connecting leads from said heating element and thermostat, and a manual control mounted on the heating unit beyond the end of said casing and outside said insulating enclosure for accessible operation by an attendant at the front of the table.

2. A hot food storage device, comprising in combination, a food compartment having a metal bottom wall, spaced metal guides integrally secured upon and beneath said bottom wall, said guides leaving portions of the bottom wall exposed between them, an open-top electrical heating unit slidably mounted for insertion and removal on said guides; said unit including two insulated heating elements placed parallel with said guides, a metal enclosure for the sides and below said heating elements, leaving the elements exposed toward said wall, a thermostat mounted upon and below said metal enclosure, and manual control means for said thermostat; and a heat insulating enclosure for said compartment and heating unit, said insulating enclosure having a front opening through which said heating unit can pass, and said manual control means being accessible from the front of said enclosure.

3. A hot food storage table, comprising in combination, a food inset compartment, an insulating enclosure for said compartment, said compartment having a metal bottom wall, spaced metal guides secured upon and directly beneath and against said bottom wall, said guides leaving portions of the bottom wall exposed between them, an open-top electrical heating unit slidably mounted for insertion and removal on said guides, said heating unit including a casing having a bottom and side walls with over-hanging edges, said edges being adapted to ride on the said metal guides, a heating element in said casing exposed for the passage of radiant heat directly to the bottom wall of said food compartment, a thermostat mounted on said heating unit out of range of radiant heat between said heating element and said compartment wall, and manual control means for said thermostat mounted on the heating unit and accessible from the outside front of said compartment.

SAMUEL H. ERSHLER.